United States Patent [19]

Walberg et al.

[11] 4,108,644

[45] Aug. 22, 1978

[54] MANUFACTURE OF REACTIVE METALS AND ALLOYS

[75] Inventors: M. Victor Walberg, Incline Village, Nev.; James H. C. Lowe, Moraga, Calif.

[73] Assignee: Viking Metallurgical Corp., Verdi, Nev.

[21] Appl. No.: 740,788

[22] Filed: Nov. 11, 1976

[51] Int. Cl.² ............................................. C22C 15/00
[52] U.S. Cl. .................................... 75/135; 75/10 V; 75/65 EB; 164/52
[58] Field of Search ................ 75/65 EB, 10 R, 10 V, 75/135, 175.5, 84; 164/52

[56] References Cited

U.S. PATENT DOCUMENTS

| 2,813,921 | 11/1957 | Vordahl et al. | 75/10 R |
| 3,338,706 | 8/1967 | Morcom et al. | 75/65 R |
| 3,933,473 | 1/1976 | Dickson | 75/10 R |

Primary Examiner—M. J. Andrews
Attorney, Agent, or Firm—Fitch, Even, Tabin & Luedeka

[57] ABSTRACT

Method for manufacturing reactive metal alloys using revert raw materials as a principal raw material source.

6 Claims, 5 Drawing Figures

MANUFACTURE OF REACTIVE METALS AND ALLOYS

This invention relates generally to the manufacture of reactive metals and their alloys and more particularly it relates to the manufacture of reactive metals or alloys having properties equal to or better than metals or alloys manufactured from prime raw materials, utilizing revert materials obtained from the fabrication of such metals or alloys into finished parts as the principal raw material.

For purposes of the present invention, the term "reactive metals" is defined as titanium and zirconium of the IVA series of the periodic table. Such metals are difficult to produce as high purity alloys which are required for fabricability due to their affinity for oxygen and other interstitial contaminants when in the molten state or when heated to elevated temperatures. Such alloys cannot be processed in induction or electric arc furnaces lined with refractory material since the metal will react with the constituents of the refractory material resulting in failure of the furnace lining and contamination of the metal product. Generally, when processing such alloys the molten metal must be contained within a solidified skull of the material being processed, i.e., a water-cooled hearth or casting mold. Further, such process must take place in an inert or vacuum environment.

A principal metal within this series is titanium, and the present invention is described with respect to the manufacture of titanium alloys. However, it is understood that alloys of other reactive metals, for example, zirconium and its alloys, may be processed in accordance with the present invention.

Because of titanium's high strength-to-weight ratio and the superior strength of titanium alloys at elevated temperatures, a principal use of titanium alloys is in the aerospace and aircraft industries. Titanium alloys are extensively used in air frames where structural parts are machined from forged or rolled sections and in jet engine construction where large diameter titanium and titanium alloy rings are used principally for support and containment.

The principal titanium alloys used in the aerospace and aircraft industries are titanium, 6 percent aluminum, 4 percent vanadium (referred to as 6-4 alloy), and titanium, 5 percent aluminum, 2½ percent tin (referred to as 5-2½ alloy). Because of the criticality of the titanium parts in the aircraft industry, the specifications for titanium alloys have, over the years, become extremely stringent. For example, the AMS specification for the 5-2½ alloy specifies a maximum interstitial content of 0.08 weight percent (w/o) carbon, 0.05 w/o nitrogen, 0.015 w/o hydrogen, 0.2 w/o oxygen, 0.5 w/o iron, not greater than 0.1 w/o of any other element, and not greater than 0.4 w/o total of all other elements. The AMS specification for the 6-4 alloy is similar except that the unlisted elements are not limited to 0.1 w/o each. However, as a practical matter, most aerospace and aircraft manufacturers require that the other individual elements not exceed 0.1 w/o and since the maximum is 0.4 w/o the specification is equally stringent. These specifications also require that the alloy be multiple-melted using the consumable electrode practice, one melt of which must be under vacuum. The strict tolerances of the specifications for trace elements and available processing techniques have limited the type and amount of revert material that could be used as raw material in the production of specification grade products.

Prime titanium alloy ingots are prepared by mixing titanium sponge, essentially titanium obtained from the Kroll process reduction of titanium tetrachloride, and a master alloy containing requisite amounts of essentially pure alloying agents. However, such sponge contains residual chlorine and reductant metal which can adversely affect the properties of the resulting alloy. The sponge and master alloy, in particulate form, are mixed together in a desired ratio and pressed or compacted, by either mechanical or hydrostatic means, into an electrode. This electrode is then melted and cast in a consumable electrode arc furnace under vacuum or invert atmosphere to provide an ingot which is turned end for end and remelted in the consumable electrode arc furnace. Double melting is required by commercial specifications to insure homogeneity of the finished ingot.

When the electrode is formed by mechanical pressing of the sponge and master alloy, it is necessary to press a series of small compacts which are tack welded together to form the finished electrode. This method of preparation presents a problem in the titanium alloy industry in that the welding operation may cause low density oxygen-nitrogen stabilized inclusions, referred to as Type 1 defects, which are detrimental to the use of the alloy. Thus, titanium alloys are prepared from electrodes which are hydrostatically pressed or in which all welding is done in a vacuum or in a protective atmosphere when the intended use is for rotating parts.

As used herein the term "revert material" refers to that material which is removed from the cast ingot in preparation of the ingot for processing, and material removed during subsequent conversion of the ingot into mill products or finished parts.

On the average, the titanium fabricating industry produces between 6 and 9 pounds of revert material for every pound of titanium which ends up as a finished part. This revert may be divided into three general categories, two of which are presently utilized to some degree as a raw material in the manufacture of alloys which meet commercial specifications. One type of revert is generally referred to as "weldable" and constitutes the relatively large pieces of revert, such as billet ends, forging punchouts, and the like, which are of sufficient physical size that they can be economically identified, arranged, and welded together with some prime raw material compacts to form a Christmas tree type of electrode which may be multiple-melted in a consumable electrode arc furnace. Because this type of revert is obtained early in the manufacturing procedure, it generally has a low surface area-to-volume ratio such that surface contamination due to exposure to the atmosphere at elevated temperatures may be mechanically or chemically removed to some degree and ingots prepared from sandblasted or pickled material may meet commercial specifications with little or no addition of titanium sponge and master alloy. However, weldable revert represents less than 30 percent of the total revert produced in the titanium industry.

A second form of revert produced in the titanium industry is in the form of intermediate sized solid material of sufficiently smaller dimension than weldable revert such that it is not economically convenient to weld this revert together to form an electrode. Examples of this type of revert are test bars, sprues and risers obtained from the casting of titanium parts, sheet, plate, bar, and wire trimmings, and flashing from closed die forging operations. These intermediate size revert materials are likewise generally relatively uncontaminated and, in some instances, have been used as feed stock in the manufacture of specification ingots by melting and pelletizing as described in U.S. Pat. No. 3,646,175 or by direct addition to the molten pool in a nonconsumable electrode arc furnace. This type of revert is about 20 percent of the total titanium revert produced.

The third and most prevalent type of revert raw material produced in the titanium industry is generated by surface metal removal such as turning, milling, drilling, planing, broaching, all of which is referred to herein as "machined chips". This form of revert constitutes 50 percent of the total revert produced in the titanium industry. Heretofore, machined chips could not be utilized to any effective degree in the titanium industry and the only effective use thereof has been as an alloying agent in the steel industry. Thus, essentially all machined chips have been lost to the titanium industry and must be replaced by prime material won from ore, an energy intensive process.

Notwithstanding the fact that there are large amounts of machined chips generated in the titanium industry, heretofore there has been no successful method of utilizing any more than a fraction of these chips in the manufacture of ingots meeting specifications. There are two principal reasons for this. First, since the titanium alloys are reactive when hot, the heat generated during forging or other hot processing is sufficient to cause the exposed surface of the titanium to react with ambient oxygen. This pickup of oxygen at the surface is in the form of scale or alpha case. Since the machined chips are obtained by cutting away the surface of the titanium alloy, the chips have a high oxygen content. Machined chips also have a high surface area-to-weight ratio and will therefore have a higher oxygen content than the parent material. Experience has shown that the average oxygen content of machined chips is in the range of 0.2 to 0.3 w/o when generated from an alloy having an oxygen content of 0.15 to 0.20 w/o. Additionally, the machined chips are contaminated with cutting fluids, generally hydrocarbons, which are utilized as coolants and lubricants in machining operations.

It is known to clean machined chips and utilize a minor proportion of such chips as raw material in the manufacture of titanium alloys. U.S. Pat. No. 3,933,473, assigned to the assignee of the present invention, utilizes machined chips as raw materials in an electron beam purification process which yields a corrosion-resistant titanium alloy. However, the product produced by the method of U.S. Pat. No. 3,933,473 does not meet current specifications for 6-4 or 5-2½ titanium alloys since the aluminum content of the alloy is reduced substantially.

As indicated above, current specifications for titanium alloys require that the alloys be multiple-melted in a consumable electrode arc furnace. Under present manufacturing conditions, it is not possible to add any machined chips to the molten pool in an arc furnace. Chips have a sufficiently low density that they are blown away by gases evolving in the area between the pool and the electrode. The existence of a magnetic field in the region between the electrode and the molten pool also causes the chips to become charged and form a bridge between the electrode and the molten pool resulting in shortout of the arc.

It is an object of the present invention to provide a method for the manufacture of reactive metals and alloys utilizing revert material as a raw material. Another object is to provide a method for the manufacture of titanium alloys which meet current specifications utilizing machined chips as the major source of raw material. A further object is to provide a method for the conversion of revert material into an electrode by electron beam melting and casting, compositing said electrode with prime titanium sponge and master alloy, and multiple-melting said electrode in a consumable electrode arc furnace to provide an ingot which meets current specifications.

These and other objects of the invention will be more readily understood from the following detailed description and from the drawings, of which:

Figure 1:
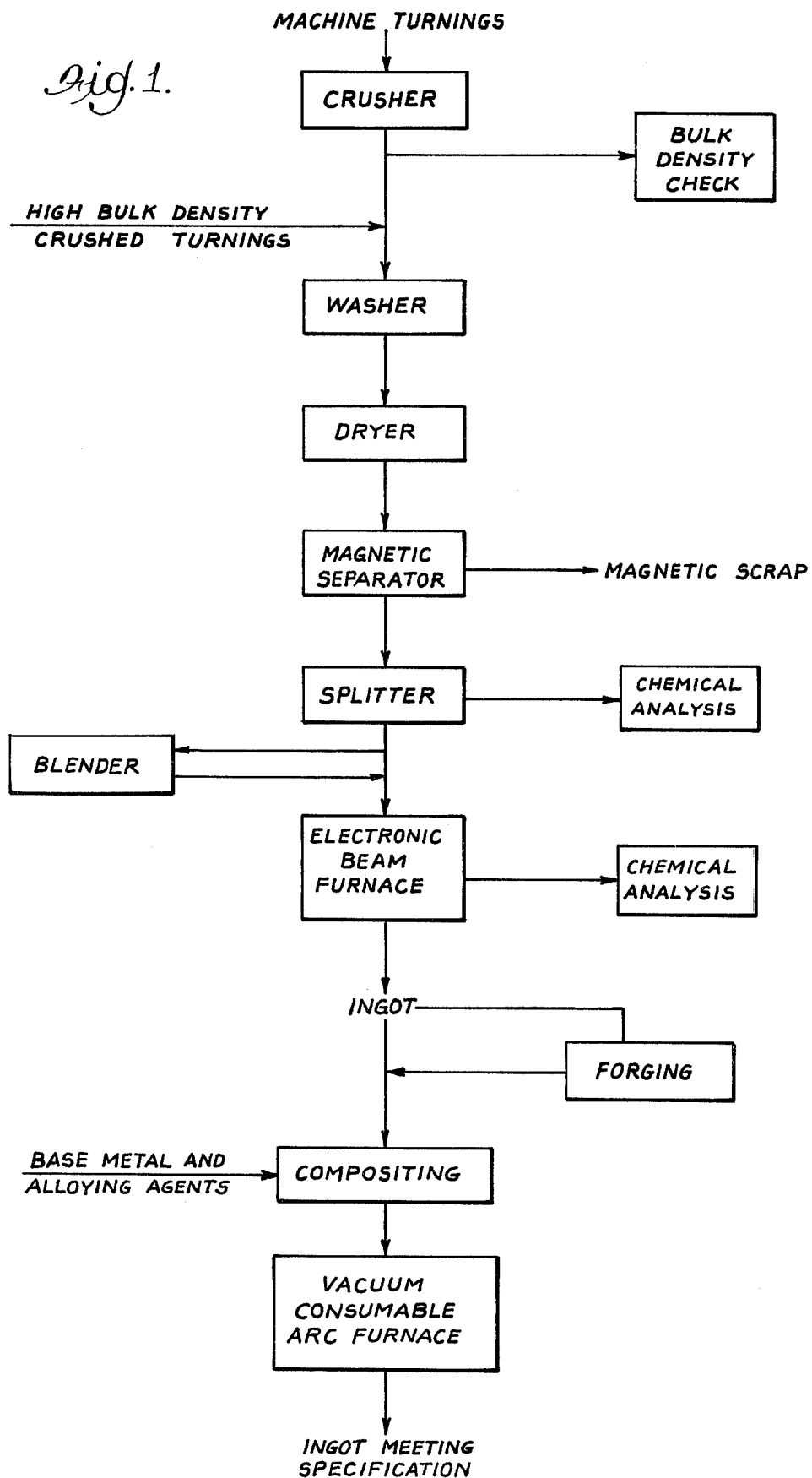
FIG. 1 depicts a flow diagram of a preferred embodiment of the invention.
Figure 2:
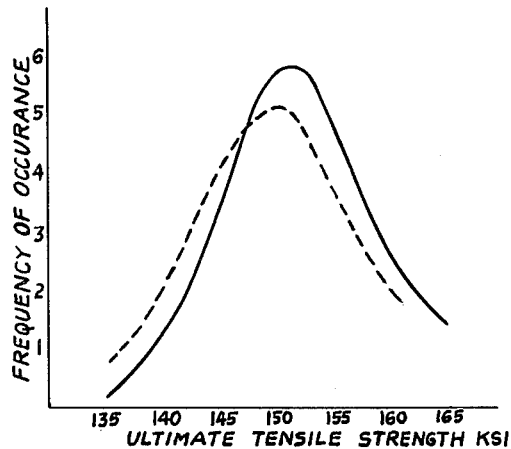
FIG. 2 is a graphical comparison of ultimate tensile strength (UTS) of forged ingots prepared in accordance with the present invention and forged ingots prepared in accordance with conventional practices.
Figure 3:
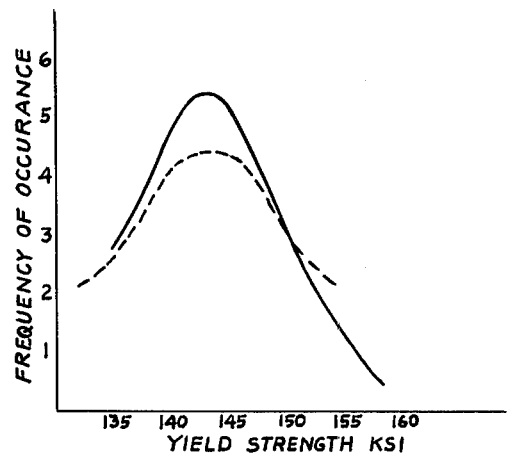
FIG. 3 is a graphical comparison of the yield strength (YS) of forged ingots prepared in accordance with the present invention and forged ingots prepared in accordance with conventional practices.
Figure 4:
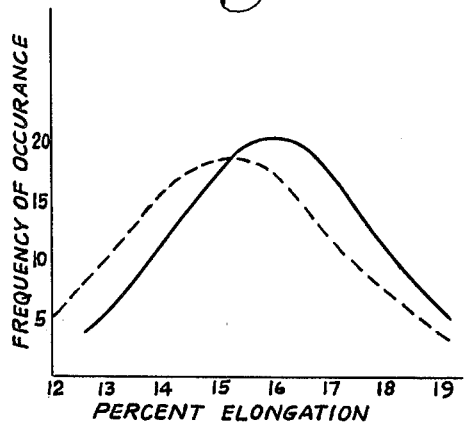
Figure 5:
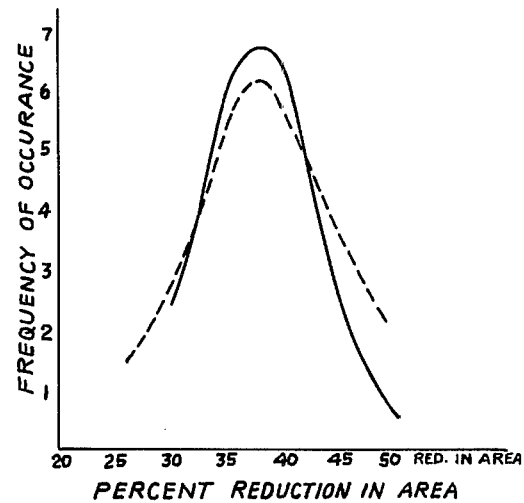

FIG. 4 is a graphical comparison of the percent elongation of forged ingots prepared in accordance with the present invention and forged ingots prepared in accordance with conventional practices; and FIG. 5 is a graphical comparison of percent reduction in the area of forged ingots prepared in accordance with the present invention and forged ingots prepared in accordance with conventional practices.

Very generally, the present invention relates to the manufacture of reactive metals and their alloys which meet current specifications using as a raw material revert reactive metal material obtained from the conversion and fabrication of semi-finished and finished parts and mill products from such alloy. More particularly, the present invention is directed to a process wherein revert materials, for example, machined chips of the desired metal or alloy, are crushed to provide a particulate raw material, the bulk density of which is controlled to above 40 pounds per cubic foot. The crushed machined chips are cleaned, for example, by washing with an alkaline solution, to remove contaminating hydrocarbons and loose scale introduced into the machined chips during the fabricating process. The washed machined chips are then dried to remove residual moisture and to provide a dry crushed raw material having a water content less than about 0.015 w/o and residual hydrocarbons of less than 0.03 w/o. Preferably, a chemical analysis of the average composition of each lot of crushed, cleaned, and dried machined chips is made to determine whether they contain excessive amounts of contaminants not permitted by specification. As indicated, the oxygen, nitrogen, hydrogen, iron, and trace metallic content is limited by the specifications. In order to provide best economic practices, the revert material should exceed 50 percent of the raw material charged to the consumable electrode arc furnace. Thus, the raw material to be charged to the electron beam furnace must have a composition such that when an electrode formed therefrom in the electron beam furnace is composited with prime materials and melted the resulting ingot will meet specifications. If any given lot of machined chips is found to be high in one or more contaminants, that lot is blended with another lot of crushed and dried machined chips whose chemical analysis indicates they are low in that particular contaminant so that a blended feed stock of revert material is obtained which will be suitable for use in the manufacture of titanium alloy ingots meeting specifications. For example, when an ingot of the invention is made utilizing 30 percent prime material and 70 percent revert material, the average composition of the revert material should not be more than 0.14 w/o of any trace element. Other ratios of prime materials to revert materials will result in different limits.

The crushed, cleaned, dried, and blended chips are then introduced into an electron beam melting and casting furnace for the purpose of melting and casting the feed stock into an electrode. A preferred form of electron beam furnace is a hearth furnace wherein the feed stock is delivered into one end of an elongated hearth by means of a suitable feed mechanism, for example, a screw feeder which feeds a vibratory feed which deposits the raw material into the hearth where it is melted. The molten metal traverses the length of the hearth and is directed into a continuous casting mold in which the molten material is solidified into an electrode. Other energy sources, i.e., cold cathode plasma guns, ion guns, etc., may be substituted for the electron beam energy source.

The electron beam melted and cast electrode is sampled along its length during casting and such samples are analyzed for chemical composition. Depending upon the particular composition, the ingot is composited with sufficient titanium sponge and master alloy, for example, in a hydrostatic press, to provide a composite electrode for consumable electrode arc melting. The composited electrode is subjected to a first melting in a consumable electrode arc furnace and is continuously cast into an ingot which is then inverted and remelted in a consumable electrode arc furnace to provide an ingot which meets specifications for that alloy.

Referring now to the process in greater detail, the raw material for the described process is that revert material customarily referred to as machined chips. These chips have a high surface area-to-weight ratio and are contaminated with the various cooling and lubricating fluids, generally hydrocarbons, used in the fabricating process. In addition, the machined chips are generally oxygen-contaminated, primarily due to the large surface area of the chips and alpha case which results from reaction of the surface of the titanium metal with oxygen at the elevated temperatures encountered during fabrication. Additionally, the machined chips contain broken tool bits, i.e., carbides, nitrides, and silicides which cannot be tolerated in discrete form under any circumstances.

It is important to carefully control the segregation of machined chips generated by the various machining operations to insure that chips of one alloy are kept separate from chips of a different alloy. This is necessary since the only practical separation between different alloys that can be made is the separation of magnetic chips from nonmagnetic chips by means of a magnetic separator. Chromium, nickel, and iron are not preferentially vaporized from the molten titanium alloy in the electron beam furnace under the conditions necessary for the melting and casting of titanium alloys, and chips containing predominating amounts of these metals must not be mixed with the revert raw material used in the instant process.

It is contemplated that other forms of revert materials may be admixed with the machined chips. Generally, any revert material that is small enough to be handled in the cleaning steps and which does not contain large amounts of undesired contaminants may be used. Examples of such materials include test bars, flashing from stamping operations, etc. In order to be used in the process, such raw material must be capable of being freed from undesirable contaminants, for example, by sandblasting, ball milling, washing, etc. Machine chips as recovered from milling operations are usually in the form of helical coils and have a very low bulk density, for example, between about 1½ and about 20 pounds per cubic foot. In such form, it is extremely difficult to effectively clean and melt the machined chips. The segregated chips are therefore crushed in a conventional crusher, for example, a ball mill or hammer mill, to increase the bulk density thereof.

The particle size of the crushed machined chips may vary over a wide extent for any given lot. Generally, the size range will include fines up to particles having a dimension of about one-fourth to three-eights of an inch by ½ inch by 0.010 to 0.085 inch thickness. Generally, at least about 9 percent of the crushed machined chips will pass through a Tyler screen having a mesh of 12.

The purpose of the crushing operation is to provide the machined chips in a physical form which is easily handled and cleaned and to increase the bulk density thereof in order to improve the economies of the process. Generally, the crushed machined chips produced from initial or rough machining operations, for example, the rough machining of hot forged ring preforms, will have a bulk density of between about 30 and about 60 pounds per cubic foot. On the other hand, crushed machined chips obtained from finish machining operations, where the bite of the cutting tool is thinner, have a much lower bulk density, for example, between about 5 and about 20 pounds per cubic foot.

It has been determined that in order to provide suitable economies in the electron beam melting and casting operation, the bulk density of the crushed raw material must be in excess of about 30 pounds per cubic foot, preferably above about 40 pounds per cubic foot. If a particular lot or batch of crushed machined chips has a bulk density below about 30 pounds per cubic foot, it is blended with a different lot of crushed machined chips which are of a higher bulk density to provide a blended lot of crushed machined chips whose average bulk density is greater than about 30 pounds per cubic foot, preferably above about 40 pounds per cubic foot. It is to be understood that where the machined chips are obtained from a rough machining operation, the bulk density may in fact always be above 40 pounds per cubic foot and where such has been ascertained by repeated weighing, it may not be necessary to routinely determine bulk density. However, where machined chips from finish machining operations are to be utilized as raw material, it is generally necessary to make bulk density determinations of each lot of crushed chips and to provide a suitable blending of low density crushed chips with high density crushed chips to provide a raw material having a desired bulk density. The blending of the different lots of crushed chips may be effected in any suitable blender, for example, a double cone rotating blender or in the cleaning apparatus.

The crushed chips of appropriate bulk density are stored until a sufficient amount of chips of a particular alloy are accumulated to be put through a cleaning cycle. The machined chips are washed in any suitable cleaning apparatus with any suitable cleansing agent which is capable of removing the hydrocarbon lubricants and other loose contaminants, i.e., scale, adhered to the surface of the crushed chips. Generally, an aqueous solution of an alkaline detergent has been found acceptable, two such detergents being sold under the trade names MC-25 or FC-3 by Pennwalt.

The cleaning operation may take place in any suitable apparatus which provides adequate contact between the machined chips and the detergent solution. It has been found to be desirable to utilize a horizontal rotating drum with a soak and spray solution of hot detergent in order to provide a cleansed product. Generally, temperatures of between about 72° F. and about 180° F. enhance the cleaning operation when alkaline detergents are utilized. Other forms of cleaning agents may require different temperatures. The machined chips are hot spray rinsed to remove residual detergent and are introduced into a dryer for removal of residual water. An indirectly heated countercurrent gas-fired drum dryer has been found acceptable to remove residual water from the crushed and cleaned machined chips. The dried chips are passed through a magnetic separator for the purpose of removing any magnetic materials from the chips. It is apparent that if the source and type of the machined chips are known with precision, this step may be eliminated. However, in most industrial operations the chance of contamination of the chips with iron is sufficient that it is good practice to conduct a magnetic separation in order to reduce the amount of iron that may become a part of the raw material charge inasmuch as iron is a contaminant in the titanium alloy and cannot be effectively separated from the alloy during processing.

After magnetic separation, it is generally desirable to pass the crushed, cleaned, and dried machined chips through a splitter/blender apparatus for the purpose of randomly dividing the flowing stream of crushed, cleaned, and dried chips into discrete segments, for example, dividing a flowing stream of dried chips from the outlet of the dryer into 4, 8, or 16 streams which are deposited into suitable containers. The purpose of this operation is to insure that any contaminant that might have found its way into the machined chips and was not removed by the cleaning and magnetic separating operations will be divided into smaller segments which will enter the subsequent electron beam refining process at different times and will therefore not appear as a gross contaminant in any one particular incremental segment of the product. This step in the process is optional but is generally desirable in order to insure uniform composition of the machined chips raw material entering the electron beam furnace.

In order to be able to accurately control the composition of the cast ingot from the electron beam furnace, keeping in mind that the specifications for titanium alloys are stringent, it is desirable to analyze the crushed, cleaned, and dried machined chips for chemical composition and also for residual hydrocarbon content, i.e., cutting lubricant. The hydrocarbon content is checked by solvent extraction and weight determination.

If it is found that a particular lot of crushed, cleaned, and dried machined chips are high in one or more contaminants, for example, oxygen, nickel, vanadium, or tin, this lot may be blended with other lots of crushed, cleaned, and dried chips which are low in that particular impurity to provide a raw material blend which is sufficiently low in trace contaminants and interstitial contaminants that when it is fabricated into an electrode it will be capable of being admixed and composited with additional titanium sponge and master alloy to provide a titanium alloy ingot which which meets specifications.

The crushed, cleaned, and dried machined chips of desired chemical composition are then introduced into an electron beam furnace for the purpose of melting and casting the titanium alloy under conditions whereby the particulate chips may be rendered molten and subsequently cast without picking up additional contaminants. This is made possible through the use of a water-cooled hearth having a skull therein of the same material being cast and also by virtue of the fact that the electron beam furnace operates at high vacuum with essentially no ambient oxygen, nitrogen, or hydrogen in contact with the molten pool thereby preventing significant interstitial contaminant pickup during the melting and casting operation.

A preferred form of electron beam furnace is that which is known as a hearth furnace. An electron beam hearth furnace includes a lock mechanism for continuously introducing the particulate machined chips into one end of an elongated generally horizontally extending hearth. The vacuum chamber in which the hearth is located is maintained at a pressure of below about $5 \times 10^{-3}$ Torr, generally within the range of between about $2 \times 10^{-3}$ Torr and about $1 \times 10^{-4}$ Torr. The machined chips are introduced at the inlet end of the hearth by means of a screw conveyor and vibratory feeder and are melted by means of electron beams in accordance with known practices. The molten alloy traverses the hearth from the inlet end to the outlet end and it is maintained in molten condition by additional electron beam bombardment along the hearth. The molten metal leaves the hearth at the outlet end thereof and flows into a water-cooled continuous casting mold. If desired, the surface of the molten metal in the casting mold is heated by additional electron beam bombardment to provide a desired pool depth within the casting mold.

Samples of the molten metal in the casting mold are taken at regular intervals, for example, every 12 inches, and analyzed for chemical composition. From this analysis, the amount of prime base metal, i.e., titanium sponge, and the amount of master alloy, i.e., the desired alloying agent, required to be added to the electron beam melted and cast ingot, is determined.

It is desirable to operate the electron beam furnace at flow rates in excess of 100 pounds per hour, preferably in excess of 200 pounds per hour, and most preferably in excess of 500 pounds per hour. It has been found that unless the bulk density of the crushed machined chips entering the furnace is greater than 30 pounds per cubic foot, preferably greater than 40 pounds per cubic foot, the desired flow rate cannot be obtained in the electron beam furnace.

The desired amount of titanium sponge and the master alloy are mixed together to provide a uniform mixture thereof. This mixture is then composited with the electron beam cast electrode by means of a hydrostatic press or by welding previously pressed compacts onto the electrode. In the hydrostatic press, the electron beam cast electrode is centrally disposed within the rubber containment bag of the hydrostatic press and the annular space between the ingot and the walls of the rubber bag is filled with the desired amount of admixed titanium sponge and master alloy. The bag is then closed and the mixture of titanium sponge and master alloy is compressed about the surface of the electron cast electrode to form a composited electrode. A pressure of between about 9,000 and about 12,000 psig in the hydrostatic press is sufficient to provide a consolidated electrode.

Where a hydrostatic press is not available, it is possible to form a compact of the mixture of titanium sponge and master alloy, preferably in the form of hemispherical segments which are then tack welded onto the electron beam cast electrode. In such instances, it is generally desirable to forge the electron beam cast ingot into a rectangular shape or to directly cast the ingot in rectangular form in the electron beam furnace such that the resulting composited electrode is generally circular in shape. As pointed out above, the necessity of tack welding the mechanically pressed compacts onto the electron beam cast electrode increases the chance of forming Type 1 defects in the subsequent alloy and is generally to be avoided.

The composited electrode is then melted and cast in a conventional arc consumable electrode furnace. Typically, such furnaces operate at a pressure between about $1 \times 10^{-1}$ and about $1.5 \times 10^{-1}$ Torr in the first melt and less than $5 \times 10^{-2}$ Torr in the subsequent melts with a pressure in the region of the molten surface of the material being cast being in the neighborhood of about 1 Torr. Such furnaces usually operate at voltages between about 20 and about 30 volts and at currents between about 12,000 and about 25,000 amperes, as is generally known in the art.

The cast ingot obtained from the arc consumable electrode furnace is then turned end for end and remelted and cast in accordance with conventional practices. The turning of the ingot end for end aids in homogenizing the raw materials and provides an ingot of more uniform composition.

In addition to the advantage of the present invention being able to utilize revert machined chips as a raw material in the manufacture of titanium alloys meeting commercial specifications, it has been found that the present invention results in increased yields of ingot to billet. It is well known that titanium alloys, particularly the 5-2½ alloy, are susceptible to edge cracking during hot forging. Edge cracks are undesirable in that they are not self-healing and unless the cracks and surface disruptions are ground out by a grinder, referred to as surface conditioning, between forging operations, the crack will continue to propagate through the billet during subsequent forging, resulting in eventual failure of the billet. Typically, losses in the manufacture of titanium alloys resulting from the necessity to grind out edge cracks during the forging operation may fall within the range of 5 to 10 percent by weight.

The ingots produced by the described method have been found to exhibit little or no edge cracking during forging. Thus, ingots may be forged directly into billet stock without the necessity of removing portions of the ingot by surface conditioning. This results in an improvement in the yield of between 3 and 7 percent of the ingot.

The present invention also contemplates the preparation of an electrode in the electron beam furnace from revert scrap material which, after melting in an arc consumable electrode furnace for the purpose of insuring homogeneity, will have the physical properties of specification grade alloys, but which does not require the addition of prime titanium sponge and master alloy. This alloy will fall within specification limits for the alloying agents, i.e., aluminum, vanadium, and tin, and within specification limits for carbon, nitrogen, and hydrogen. However, the alloy will be outside the present specification limits for oxygen and possibly iron and may also be outside the 0.4 w/o limit of all other elements.

It has been discovered that machined chips which are processed in accordance with the present invention result in an electron beam melted electrode having unexpected physical properties. The oxygen content of the electrode is between about 0.2 and about 0.3 w/o, typically between about 0.23 and about 0.26 w/o. The aluminum content is preferably maintained at the low end of the specification range, i.e., between about 5.5 and about 6.0 w/o for the 6-4 alloy and between about 4.0 and 5.0 w/o for the 5-2½ alloy because of the higher oxygen content.

This form of the invention is different from that previously described in that the aluminum content of the machined chips melted and cast in the electron beam furnace must be controlled. Aluminum is preferentially evaporated under the conditions necessary to melt and cast the titanium alloy. When the electrode is to be composited with master alloy, any aluminum that has evaporated can be added back prior to arc melting. However, when the electrode is not composited, the aluminum content of the alloy must be controlled while in the electron beam furnace.

The aluminum content of the alloy may be controlled by adding aluminum shot to the machined chips raw materials, or by feeding an aluminum rod, preferably an aluminum, 6 w/o titanium rod, into the molten material in the hearth adjacent the point where the molten metal overflows the hearth into the casting mold. It has been found that feeding an aluminum rod into molten material in the hearth affords better control over the aluminum content of the electrode.

The amount of aluminum added will depend upon the operating conditions in the electron beam furnace. Higher temperature and/or low pressure will cause more aluminum to evaporate. It has been found that the addition of about 3 w/o aluminum shot to the machined chips or the feeding of an aluminum rod at a rate equal to 3 w/o of the casting rate provides an electrode having desired aluminum content.

The physical properties of this form of alloy are set forth in Table I under the heading "Electron Beam". It is surprising that alloys having oxygen contents above 0.20 w/o would have these excellent physical properties.

Ninety-three ingots of specification grade 6-4 titanium alloy were manufactured in accordance with the present invention. Machined chips obtained from machining operations were carefully segregated to avoid contamination and were crushed. The bulk density of the crushed chips was determined and adjusted to above 40 pounds per cubic foot, when necessary. The crushed turnings were then introduced into a rotating drum washer and were washed with an alkaline detergent at a temperature of 70° C. to 75° C., spray rinsed, and dried in a countercurrent flow, indirectly heated rotary drum dryer. The throughput of machined chips through the washer and dryer was between about 200 and about 500 pounds per hour.

The machined chips were then passed through a magnetic separator for removal of magnetic material and delivered to the feed inlet of a splitter-blender unit. The splitter-blender separated the flowing stream of dried chips into 16 streams which were delivered to suitable collection vessels. A composite sample of chips was taken at intervals which was analyzed for hydrocarbon content to insure that the hydrocarbon content is maintained below 0.03 w/o.

The machined chips were then introduced into an electron beam hearth furnace maintained at a pressure of between about $1 \times 10^{-4}$ and $3 \times 10^{-3}$ Torr by means of a screw conveyor and vibratory feeder at a rate of about 500 pounds per hour. The chips were melted by electron beam bombardment and the molten metal flowed across the hearth to a continuous casting mold. The metal was maintained in a molten state by electron beam bombardment. The molten metal was solidified into an electrode in the casting mold at a rate of between about 200 and about 700 pounds per hour. Samples of the molten metal in the casting mold were taken at regular intervals during casting.

Samples from the top, middle, and bottom of each of the electrodes were analyzed. Based upon this analysis, quantities of prime titanium sponge and master alloy were mixed in proper ratios and composited around the electrodes in a hydrostatic press. The composited electrodes were then double-melted in an arc consumable electrode furnace.

The physical properties of the 93 ingots produced in accordance with the present invention were compared against the physical properties of 93 ingots prepared by conventional methods. Of the conventional ingots analyzed, 49 were prepared from 100 percent prime raw materials and 44 were prepared from weldable revert material to which minor amounts of prime raw materials had been added. The data obtained is set forth in Table I and is graphically represented in FIGS. 2 through 5 of the drawings. The data representing the properties of the present invention are shown in solid line and the data representing the properties of the conventionally produced product are shonw in dotted line.

invention are slightly higher than the conventional ingots and that the yield strength is only slightly lower. It will also be seen from FIGS. 2 through 5 that the spread of the data for the ingots of the invention is somewhat lesser indicating that the invention produces slightly more uniform properties. Reference to Table I shows that there is good agreement between the arithmetic average of the data and the normal distribution of the data.

The improved physical properties obtained as well as the improved yield of billet from ingot that is realized from the present invention are believed to result from the increased preferential evaporation or evolution of trace or minute levels of certain elements in an electron beam furnace that are not removed in conventional arc processes. In the electron beam hearth the molten metal is subjected to extended exposure of high vacuum, e.g., less than 5 microns of mercury, for about 10 minutes, when a molten bath of about 100 pounds of alloy contained in a skull of about 300 pounds is cast at a rate of 600 pounds per hour. Further, since all of the energy input is at the surface of the liquid metal there is substantial thermal stirring of the molten metal thereby insuring that all of the metal is exposed to the high vacuum environment. Substantially higher pressures are used in both consumable and nonconsumable arc processes and the molten metal is exposed to the vacuum for a shorter period.

All current production of titanium comes from the reduction of the chloride, resulting in small amounts of residual chlorine in the prime sponge material. Further, most domestic production of sponge now employs the Kroll process which uses magnesium or, alternatively, sodium as the reductant of the titanium chloride. Thus there are additionally trace amounts of magnesium or sodium residue in the sponge produced by the Kroll process. Most sponge producers now vacuum distill the sponge product to reduce the residual chlorine and in the case of Kroll the sodium or magnesium. The higher degree of vacuum encountered in the electron beam hearth coupled with the well stirred molten pool are Table I

| Physical Property | Conventional | | Electron Beam-Var | | Electron Beam |
| --- | --- | --- | --- | --- | --- |
| | Numerical Average | Normal Distrib. | Numerical Average | Normal Distrib. | |
| Ultimate Tensile Strength | | | | | |
| Prime ingot[1] | 150.3 | | | | |
| Revert ingot[2] | 149.7 | | | | |
| Total | 150.6 | 150.3 | 151.6 | 151.5 | 157.7 |
| Yield Strength | | | | | |
| Prime ingot | 144.1 | | | | |
| Revert ingot | 143.1 | | | | |
| Total | 143.6 | 143.5 | 142.8 | 143.0 | 156.5 |
| Percent Elongation | | | | | |
| Prime ingot | 14.7 | | | | |
| Revert ingot | 15.4 | | | | |
| Total | 15.0 | 15.2 | 15.7 | 16.0 | 15.0 |
| Percent Reduction of Area | | | | | |
| Prime ingot | 37.8 | | | | |
| Revert ingot | 37.7 | | | | |
| Total | 37.7 | 37.6 | 38.1 | 38.0 | 38.6 |

Notes:
[1] 49 ingots made from 100 percent prime raw materials.
[2] 44 ingots made from weldable revert with minor additions of prime raw materials.

The figures under the heading "Normal Distribution" and the graphical representations of FIGS. 2 through 5 were obtained using the normal frequency distribution technique set forth in Perry's Chemical Engineers Handbook, 4th Edition, pages 2-67.

It will be seen that the ultimate tensile strength, elongation, and reduction in area of the ingots of the present conducive to further evaporation of chlorine, and in the case of the Kroll process sodium or magnesium, resulting in a lower residual level of these elements in the electron beam hearth processed electrode.

Additionally there are other elements, which will preferentially evaporate or evolve to lower levels as a result of higher vacuum and longer exposure times, which may be adverse to processing. Included in this category is hydrogen which is present in the sponge and also in increased amounts in revert material due to pickup in the hot processing of titanium ingots into billets or other products, copper which may be picked up during the consumable electrode arc process, and various other tramp elements encountered as a normal course of events in any scrap recovery process.

What is claimed is:

1. A method for the manufacture of a reactive metal alloy, comprising collecting revert material of said alloy, a majority of said revert material being machined chips, crushing said revert material, controlling the bulk density of said crushed revert material to above 30 pounds per cubic foot, washing and drying said crushed revert material, melting and casting said revert material into an electrode in an electron beam furnace, analyzing said electrode to determine the chemical composition thereof, compositing said electrode with quantities of prime base metal and alloying agents based upon said analysis, and melting and casting said composited electrode in a consumable electrode vacuum arc furnace.

2. A method in accordance with claim 1 wherein the washing and drying of the crushed revert material is controlled to provide a cleaned revert material containing less than 0.03 w/o hydrocarbon.

3. A method in accordance with claim 1 wherein said reactive metal is titanium, wherein said electrode is analyzed for aluminum, vanadium, tin, oxygen, nickel, chromium and iron and wherein the amount of prime titanium and alloying agents composited with said electrode is selected to provide an ingot which meets specifications for said alloy.

4. A method in accordance with claim 3 wherein said reactive metal alloy is selected from titanium, 6 w/o aluminum - 4 w/o vanadium and titanium, 5 w/o aluminum - 2½ w/o tin.

5. A method for the manufacture of a reactive metal alloy comprising, collecting revert material of said alloy, a majority of said revert material being machined chips, crushing said revert material, controlling the bulk density of said crushed revert material to above 30 pounds per cubic foot, cleaning said revert material, drying said revert material, controlling the average composition of said revert material to below about 0.08 w/o carbon, about 0.05 w/o nitrogen, and about 0.015 w/o hydrogen, and melting and casting said revert material in an electron beam furnace.

6. A method in accordance with claim 5 wherein the composition of the revert material is additionally controlled to between about 0.2 w/o and about 0.3 w/o oxygen and wherein aluminum is added to the molten revert material in the electron beam furnace.

* * * * *